(12) United States Patent
Lippert et al.

(10) Patent No.: US 10,145,453 B2
(45) Date of Patent: Dec. 4, 2018

(54) MULTI-SPEED TRANSMISSION

(71) Applicant: Ford Global Technologies, LLC, Dearborn, MI (US)

(72) Inventors: Robert Scott Lippert, Ann Arbor, MI (US); David Allen Janson, Plymouth, MI (US); Donald Edward Hoffman, Canton, MI (US); Reid Alan Baldwin, Linden, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/410,997

(22) Filed: Jan. 20, 2017

(65) Prior Publication Data

US 2017/0130806 A1    May 11, 2017

Related U.S. Application Data

(63) Continuation-in-part of application No. 13/790,105, filed on Mar. 8, 2013.

(51) Int. Cl.
    *F16H 3/66*    (2006.01)

(52) U.S. Cl.
    CPC ....... *F16H 3/66* (2013.01); *F16H 2200/0065* (2013.01); *F16H 2200/0091* (2013.01); *F16H 2200/2012* (2013.01); *F16H 2200/2048* (2013.01); *F16H 2200/2066* (2013.01); *F16H 2200/2082* (2013.01); *F16H 2200/2097* (2013.01)

(58) Field of Classification Search
    CPC ............... F16H 3/66; F16H 2200/0065; F16H 2200/0091; F16H 2200/2012; F16H 2200/2082; F16H 2200/2097; F16H 2200/2066; F16H 2200/2046; F16H 2200/2038; F16H 2200/201; F16H 2200/2007; F16H 2200/2048; F16H 2200/2041
    See application file for complete search history.

(56) References Cited

U.S. PATENT DOCUMENTS

| | | | |
|---|---|---|---|
| 5,133,697 | A | 7/1992 | Hattori |
| 6,955,627 | B2 | 10/2005 | Thomas et al. |
| 6,960,149 | B2 | 11/2005 | Ziemer |
| 7,163,484 | B2 | 1/2007 | Kienen |
| 7,556,582 | B2 | 7/2009 | Gumpoltsberger |
| 7,575,533 | B2 | 8/2009 | Gumpoltsberger |
| 7,632,206 | B2 | 12/2009 | Gumpoltsberger |

(Continued)

OTHER PUBLICATIONS

Chinese Office Action dated Apr. 26, 2017 for corresponding Chinese Application No. 201410083688.4, 5 pages.

(Continued)

*Primary Examiner* — David J Hlavka
(74) *Attorney, Agent, or Firm* — James Dottavio; Brooks Kushman P.C.

(57) ABSTRACT

A transmission gearing arrangement produces ten forward speed ratios and four reverse speed ratio by selective engagement of three shift elements in various combinations. Some embodiment includes four simple planetary gear sets and seven shift elements of which three or four are brakes. Another embodiment includes two axis transfer gear pairs in place of one of the planetary gear sets. One of the brakes is used only in reverse and may be a latch.

22 Claims, 5 Drawing Sheets

(56) References Cited

U.S. PATENT DOCUMENTS

| | | |
|---|---|---|
| 7,686,730 B2 | 3/2010 | Baldwin |
| 7,988,586 B2 | 8/2011 | Phillips et al. |
| 8,177,674 B2 | 5/2012 | Baldwin |
| 8,210,981 B2 | 7/2012 | Bauknecht et al. |
| 8,210,982 B2 | 7/2012 | Gumpoltsberger et al. |
| 8,210,983 B2 | 7/2012 | Gumpoltsberger et al. |
| 8,231,495 B2 | 7/2012 | Gumpoltsberger et al. |
| 8,231,496 B2 | 7/2012 | Gumpoltsberger et al. |
| 8,231,501 B2 | 7/2012 | Gumpoltsberger et al. |
| 8,246,504 B2 | 8/2012 | Gumpoltsberger et al. |
| 8,251,859 B2 | 8/2012 | Gumpoltsberger et al. |
| 8,287,420 B2 | 10/2012 | Gumpoltsberger et al. |
| 8,303,455 B2 | 11/2012 | Gumpoltsberger et al. |
| 8,398,522 B2 | 3/2013 | Bauknecht et al. |
| 8,444,524 B2 | 5/2013 | Gumpoltsberger et al. |
| 8,529,394 B2 | 9/2013 | Gumpoltsberger et al. |
| 8,663,056 B2 | 3/2014 | Gumpoltsberger et al. |
| 8,764,598 B2 | 7/2014 | Kim |
| 2004/0102280 A1 | 5/2004 | Usoro et al. |
| 2004/0110597 A1 | 6/2004 | Lee et al. |
| 2007/0225109 A1 | 9/2007 | Jang |
| 2008/0004154 A1* | 1/2008 | Park ................... F16H 3/66 475/276 |
| 2011/0045938 A1 | 2/2011 | Gumpoltsberger et al. |
| 2011/0045943 A1* | 2/2011 | Gumpoltsberger ....... F16H 3/66 475/275 |
| 2013/0023376 A1 | 1/2013 | Hart |
| 2013/0040776 A1 | 2/2013 | Mellet et al. |
| 2013/0190127 A1 | 7/2013 | Singh |
| 2013/0203542 A1 | 8/2013 | Garcia et al. |
| 2013/0260942 A1 | 10/2013 | Garcia |
| 2013/0281246 A1 | 10/2013 | Neelakantan et al. |
| 2013/0324346 A1* | 12/2013 | Garcia ................. F16H 3/62 475/205 |
| 2014/0011626 A1 | 1/2014 | Bockenstette et al. |
| 2014/0018204 A1 | 1/2014 | Mellet et al. |
| 2014/0045640 A1 | 2/2014 | Goleski et al. |
| 2014/0057751 A1 | 2/2014 | Mellet et al. |
| 2014/0349803 A1* | 11/2014 | Takeuchi ............. F16H 3/66 475/275 |

OTHER PUBLICATIONS

Benford, H., et al., The Lever Analogy: A New Tool in Transmission Analysis, 1982, Society of Automotive Engineers, Inc. 810102, p. 429-437.

Chinese Office Action dated Jun. 4, 2018 in corresponding CN201410083688.4, 5 pages.

* cited by examiner

MULTI-SPEED TRANSMISSION

CROSS-REFERENCE TO RELATED APPLICATIONS

This application is a continuation-in-part of U.S. application Ser. No. 13/790,105 filed Mar. 8, 2013, the disclosure of which is hereby incorporated in its entirety by reference herein.

TECHNICAL FIELD

This disclosure relates to the field of automatic transmissions for motor vehicles. More particularly, the disclosure pertains to an arrangement of gears, clutches, and the interconnections among them in a power transmission.

BACKGROUND

Many vehicles are used over a wide range of vehicle speeds, including both forward and reverse movement. Some types of engines, however, are capable of operating efficiently only within a narrow range of speeds. Consequently, transmissions capable of efficiently transmitting power at a variety of speed ratios are frequently employed. When the vehicle is at low speed, the transmission is usually operated at a high speed ratio such that it multiplies the engine torque for improved acceleration. At high vehicle speed, operating the transmission at a low speed ratio permits an engine speed associated with quiet, fuel efficient cruising. Typically, a transmission has a housing mounted to the vehicle structure, an input shaft driven by an engine crankshaft, and an output shaft driving the vehicle wheels, often via a differential assembly which permits the left and right wheel to rotate at slightly different speeds as the vehicle turns.

Some vehicles are equipped with a transfer case which directs the power to both front wheels and rear wheels. Some transfer cases provide multiple transfer case ratios between the transmission output shaft and the differential such that a driver can select a high range and a low range. The high range may be selected for on-road transportation while the low range may be used to provide higher speed ratios for off-road use. When a two speed transfer case is present, the overall ratio is the product of the transmission ratio and the transfer case ratio. In some situations, such as transitioning from on-road to off-road or from off-road to on-road conditions, it is desirable to shift between high and low range while the vehicle is moving, preferably without interrupting the flow of power to the vehicle wheels. In a transverse front wheel drive vehicle, space limitations usually preclude use of a two speed transfer case.

SUMMARY OF THE DISCLOSURE

In a first embodiment, a transmission includes first and second gearsets. The first gearset has a first sun, a first ring fixedly coupled to an output, and a first carrier selectively held against rotation by a first brake and selectively coupled to an input by a first clutch. The first brake may be a latch. The second gearset has a second sun selectively held against rotation by a second brake, a second ring fixedly coupled to the first carrier, and a second carrier fixedly coupled to the output. The transmission may also include a gearing arrangement configured to selectively establish a plurality of speed ratios between the first sun and the input. The plurality of speed ratios may include zero, one, and three ratios between zero and one. The gearing arrangement may include a transmission case, an intermediate shaft, third and fourth gearsets, a third brake, and second and third clutches. The third gearset may have a third sun coupled to the input, a third ring coupled to the intermediate shaft, and a third carrier. The fourth gearset may have a fourth sun coupled to the transmission case, a fourth ring coupled to the third carrier, and a fourth carrier fixedly coupled to the first sun. The third brake may selectively holding the intermediate shaft against rotation. The third brake may be a combination of a friction brake and a passively one way brake. The second clutch may selectively couple the first sun to the intermediate shaft. The third clutch may selectively couple the input to the intermediate shaft.

In a second embodiment, a transmission includes a first gearing arrangement fixedly imposing an overdrive relationship between a first shaft and a second shaft, a second gearing arrangement selectively imposing a linear speed relationship among an input shaft, the second shaft, and a third shaft, a first brake selectively holding the third shaft against rotation, and first and second clutches selectively coupling the third shaft to the first shaft and the input shaft, respectively. The first brake may include both an actively controlled friction brake and a passive one way brake. The first gearing arrangement may, for example, be a simple planetary gear set. The second gearing arrangement may, for example, be a simple planetary gear set in combination with a clutch. A third gearing arrangement may impose a variety of speed relationships among the first shaft, the input shaft, and an output shaft. In some states, the third gearing arrangement may impose an underdrive relationship between the first shaft and the output shaft. In some states, the third gearing arrangement may impose a linear speed relationship among the first shaft, the input shaft, and the output shaft. In other states, the third gearing arrangement may constrain the output shaft to rotate in the opposite direction as the first shaft.

In a third embodiment, a transmission includes a first gearing arrangement fixedly imposing an overdrive relationship between a first shaft and a second shaft, a second gearing arrangement fixedly imposing a linear speed relationship among an input shaft, the second shaft, and a third shaft, and a third gearing arrangement imposes a variety of speed relationships among the first shaft, the input shaft, and an output shaft. In some states, the third gearing arrangement imposes an underdrive relationship between the first shaft and the output shaft. In some states, the third gearing arrangement imposes a linear speed relationship among the first shaft, the input shaft, and the output shaft. In other states, the third gearing arrangement constrains the output shaft to rotate in the opposite direction as the first shaft. A plurality of shift element selectively couple combinations of the input shaft, the first shaft, and the third shaft and selectively hold the third shaft against rotation. The plurality of shift elements may, for example, be arranged as a shift element module having a common shaft coupled to each of the first shaft, the third shaft, the input shaft, and the housing by separate shift elements.

DETAILED DESCRIPTION

Figure 1:
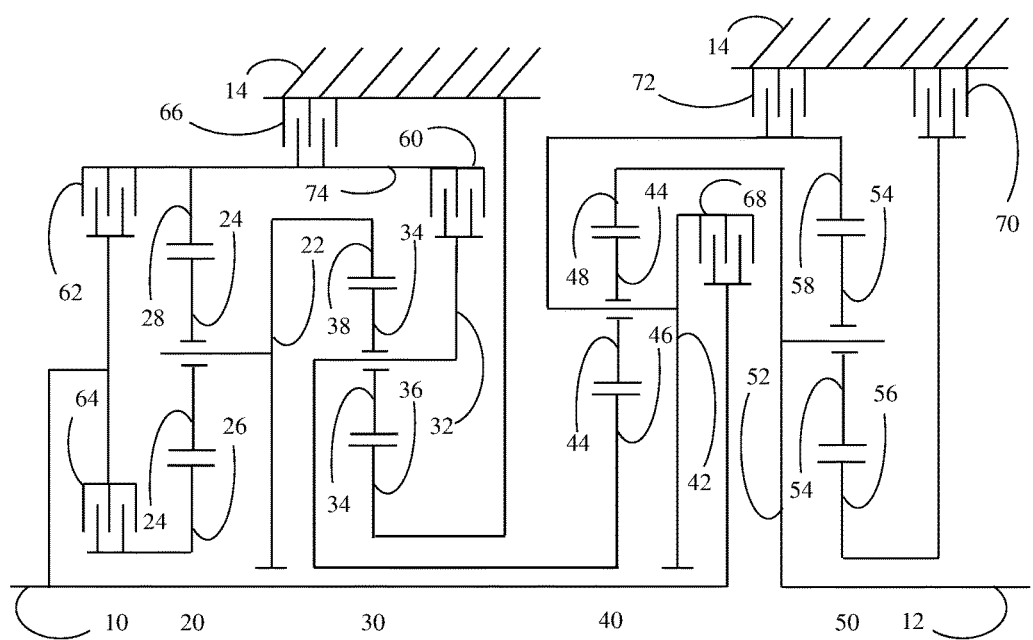
FIG. 1 is a schematic diagram of a first transmission gearing arrangement.

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

A gearing arrangement is a collection of rotatable elements and shift elements configured to impose specified speed relationships among the rotatable elements. Some speed relationships, called fixed speed relationships, are imposed regardless of the state of any shift elements. Other speed relationships, called selective speed relationships, are imposed only when particular shift elements are fully engaged. A linear speed relationship exists among an ordered list of rotatable elements when i) the first and last rotatable element in the ordered list are constrained to have the most extreme speeds, ii) speeds of the remaining rotatable elements are each constrained to be a weighted average of the first and last rotatable elements, and iii) when the speeds of the rotatable elements differ, they are constrained to be in the listed order, either increasing or decreasing. The speed of a rotatable element is positive when the element rotates in one direction and negative when the element rotates in the opposite direction. A discrete ratio transmission has a gearing arrangement that selectively imposes a variety of speed ratios between an input shaft and an output shaft.

A group of rotatable elements are fixedly coupled to one another if they are constrained to rotate at the same speed about the same axis in all operating conditions. Rotatable elements can be fixedly coupled by, for example, spline connections, welding, press fitting, or machining from a common solid. Slight variations in rotational displacement between fixedly coupled elements can occur such as displacement due to lash or shaft compliance. One or more rotatable elements that are all fixedly coupled to one another may be called a shaft. In contrast, two rotatable elements are selectively coupled by a shift element when the shift element constrains them to rotate at the same speed about the same axis whenever the shift element is fully engaged and the rotatable elements are free to rotate at distinct speeds in at least some other operating condition. A shift element that holds a rotatable element against rotation by selectively connecting it to the housing is called a brake. A shift element that selectively couples two or more rotatable elements to one another is called a clutch. Shift elements may be actively controlled devices such as hydraulically or electrically actuated clutches or brakes or may be passive devices such as one way clutches or brakes. Two rotatable elements are coupled if they are either fixedly coupled or selectively coupled.

An example transmission is schematically illustrated in FIG. 1. The transmission utilizes four simple planetary gear sets 20, 30, 40, and 50. A planet carrier 22 rotates about a central axis and supports a set of planet gears 24 such that the planet gears rotate with respect to the planet carrier. External gear teeth on the planet gears mesh with external gear teeth on a sun gear 26 and with internal gear teeth on a ring gear 28. The sun gear and ring gear are supported to rotate about the same axis as the carrier. Gear sets 30, 40, and 50 are similarly structured.

A simple planetary gear set is a type of gearing arrangement that imposes a fixed linear speed relationship among the sun gear, the planet carrier, and the ring gear. Other known types of gearing arrangements also impose a fixed linear speed relationship among three rotatable elements. For example, a double pinion planetary gear set imposes a fixed linear speed relationship between the sun gear, the ring gear, and the planet carrier.

A suggested ratio of gear teeth for each planetary gear set is listed in Table 1.

TABLE 1

| Ring 28/Sun 26 | 1.91 |
| Ring 38/Sun 36 | 1.87 |
| Ring 48/Sun 46 | 1.47 |
| Ring 58/Sun 56 | 2.59 |

In the transmission of FIG. 1, sun gear 36 is fixedly held against rotation, carrier 22 is fixedly coupled to ring gear 38, ring gear 28 is fixedly coupled to intermediate shaft 74, carrier 32 is fixedly coupled to sun gear 46, carrier 42 is fixedly coupled to ring gear 58, and output shaft 12 is fixedly coupled to ring gear 48 and carrier 52. Input shaft 10 is selectively coupled to sun gear 26 by clutch 64 and selectively coupled to intermediate shaft 74 by clutch 62. Intermediate shaft 74 is selectively held against rotation by brake 66 and selectively coupled to carrier 32 and sun gear 46 by clutch 60. Carrier 42 and ring gear 58 are selectively held against rotation by brake 72 and selectively coupled to input shaft 10 by clutch 68. Sun gear 56 is selectively held against rotation by brake 70.

Various combinations of gear sets, clutches, and brakes selectively impose particular speed relationships. The combination of gear set 20 and clutch 64 selectively imposes a linear speed relationship between input shaft 10, ring gear 38, and intermediate shaft 74. Gear set 30 fixedly imposes an overdrive relationship between carrier 32 and ring gear 38. In other words, ring gear 38 is constrained to rotate faster than the carrier 32 and in the same direction in all operating conditions. The combination of gear sets 20 and 30, clutches 60, 62, and 64, and brake 66 selectively establish several speed ratios between input shaft 10 and carrier 32. Specifically, carrier 32 may be constrained to rotate at the same speed as input shaft 10, it may be held against rotation, and it may be constrained to rotate at three different speed ratios between zero and one. The combination of gear set 50 and brake 70 selectively imposes an overdrive relationship between output shaft 12 and carrier 42. In other words, whenever brake 70 is engaged, carrier 42 is constrained to rotate faster than output shaft 12 and in the same direction. The combination of gear sets 40 and 50, clutch 68, and brakes 70 and 72 selectively establish various speed relationships among carrier 32, input shaft 10, and output shaft 12. When brake 72 is engaged, output shaft 12 rotates in the opposite direction as carrier 32. When brake 70 is engaged, output shaft 12 rotates in the same direction as carrier 32 but at a slower speed. When clutch 68 is engaged, a linear speed relationship is established among carrier 32, input shaft 10, and output shaft 12.

As shown in Table 2, engaging the shift elements in combinations of three establishes ten forward speed ratios and four reverse speed ratio between input shaft 10 and output shaft 12. An X indicates that the shift element is required to establish the speed ratio. An (X) indicates the clutch can be applied but is not required. In 4th gear, clutch 68 and brake 70 establish the power flow path between input shaft 10 and output shaft 12. Any one of shift elements 60, 62, 64, or 66 can also be applied. Applying clutch 62 ensures that all single and two step shifts from 4th gear can be accomplished by engaging only one shift element and releasing only one shift element. When the gear sets have tooth number ratios as indicated in Table 1, the speed ratios have the values indicated in Table 2.

TABLE 2

| | 60 | 62 | 64 | 66 | 68 | 70 | 72 | Ratio | Step |
|---|---|---|---|---|---|---|---|---|---|
| Low Rev | | | X | X | | | X | −6.57 | 75% |
| R1 | X | | X | | | | X | −3.76 | |
| R2 | | X | X | | | | X | −2.26 | |
| R3 | X | X | | | | | X | −1.47 | |
| Low | | | X | X | | X | | 8.73 | |
| 1st | X | | X | | | X | | 4.99 | 1.75 |
| 2nd | | X | X | | | X | | 3.00 | 1.67 |
| 3rd | X | X | | | | X | | 1.95 | 1.54 |
| 4th | | (X) | | | X | X | | 1.39 | 1.41 |
| 5th | X | X | | | X | | | 1.00 | 1.39 |
| 6th | | X | X | | X | | | 0.81 | 1.24 |
| 7th | X | | X | | X | | | 0.71 | 1.14 |
| 8th | | | X | X | X | | | 0.66 | 1.08 |
| 9th | X | | | X | X | | | 0.60 | 1.10 |

The transmission provides for both high and low range operation without a two speed transfer case. When the driver selects drive (forward) and high range, the transmission is prepared for vehicle launch in 1st by engaging clutches 60 and 64 and brake 70. A shift to 2nd may be accomplished by gradually disengaging clutch 60 while gradually engaging clutch 62. Additional upshifts are accomplished according to Table 2. When the driver selects drive (forward) and low range, the transmission is prepared for vehicle launch by engaging clutch 64 and brakes 66 and 70. A shift to 1st may be accomplished by gradually disengaging brake 66 while gradually engaging clutch 60. If the brake 66 includes a one way clutch, the one way clutch will disengage passively as clutch 60 is engaged, eliminating the need to actively control the disengagement. Additional shifts into the remaining forward ratios may be accomplished as described above for high range.

When the driver selects reverse and high range, the transmission is prepared for vehicle launch in reverse by engaging clutches 60 and 64 and brake 72. When the driver selects reverse and low range, the transmission is prepared for vehicle launch by engaging clutch 64 and brakes 66 and 72. A shift into high range reverse may be accomplished without interrupting power by gradually disengaging brake 66 while gradually engaging clutch 60. Brake 72 is used in all reverse speed ratios and not used in any forward speed ratios. Consequently, brake 72 may be a latch that has only a fully engaged state and a fully disengaged state, as opposed to a friction brake capable of transmitting torque in a partially engaged slipping state. For example, brake 72 may be a dog clutch or a synchronizer.

Figure 2:
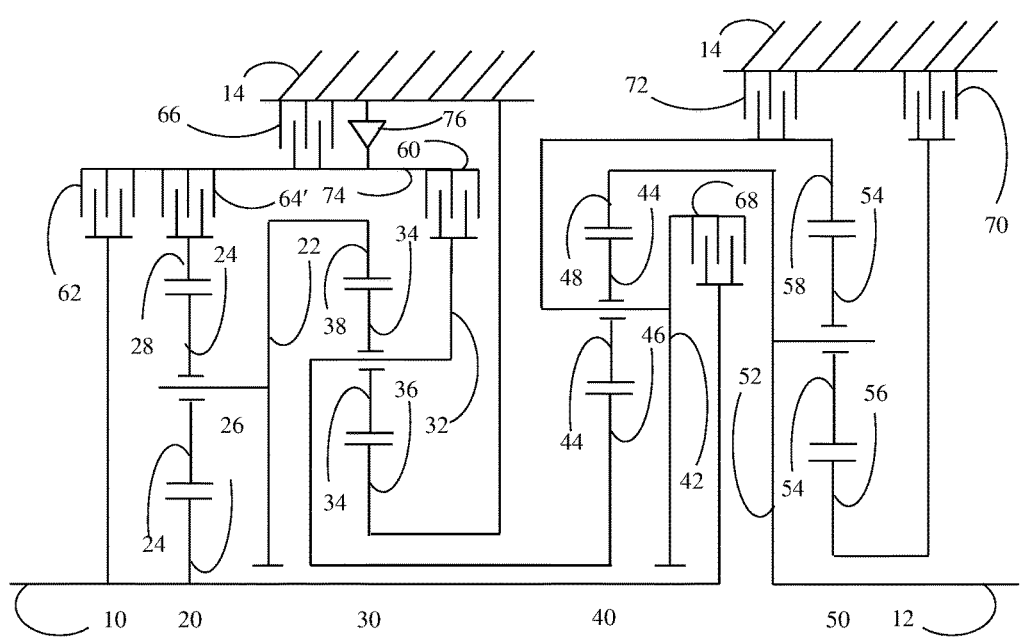
FIG. 2 is a schematic diagram of a second transmission gearing arrangement.

A second example transmission is illustrated in FIG. 2. This transmission utilizes four simple planetary gear sets with suggested tooth number ratios as shown in Table 1. Input shaft 10 is fixedly coupled to sun gear 26, sun gear 36 is fixedly held against rotation, carrier 22 is fixedly coupled to ring gear 38, carrier 32 is fixedly coupled to sun gear 46, carrier 42 is fixedly coupled to ring gear 58, and output shaft 12 is fixedly coupled to ring gear 48 and carrier 52. Intermediate shaft 74 is selectively coupled to carrier 32 by clutch 60, selectively coupled to input shaft 10 by clutch 62, selectively coupled to ring gear 28 by clutch 64', and selectively held against rotation by brake 66. Applying two of the three clutches selectively couples the corresponding two rotatable elements. Applying one of the three clutches and the brake selectively holds the corresponding rotatable element against rotation. Carrier 42 and ring gear 58 are selectively held against rotation by brake 72 and selectively coupled to input shaft 10 by clutch 68. Sun gear 56 is selectively held against rotation by brake 70.

The transmission of FIG. 2 is operated in the same fashion as the transmission of FIG. 1. Optional one way brake 76 may passively restrain intermediate shaft 74 from rotatable in one direction while allowing rotation in the opposite direction. If one way brake 74 is present, then it is not necessary to engage brake 66 to transmit power from the input to the output in either Low or Low Reverse. Optional one way brake 74 simplifies the shift from Low to 1st because it is unnecessary to actively control an off-going shift element in coordination with an oncoming shift element.

Figure 3:
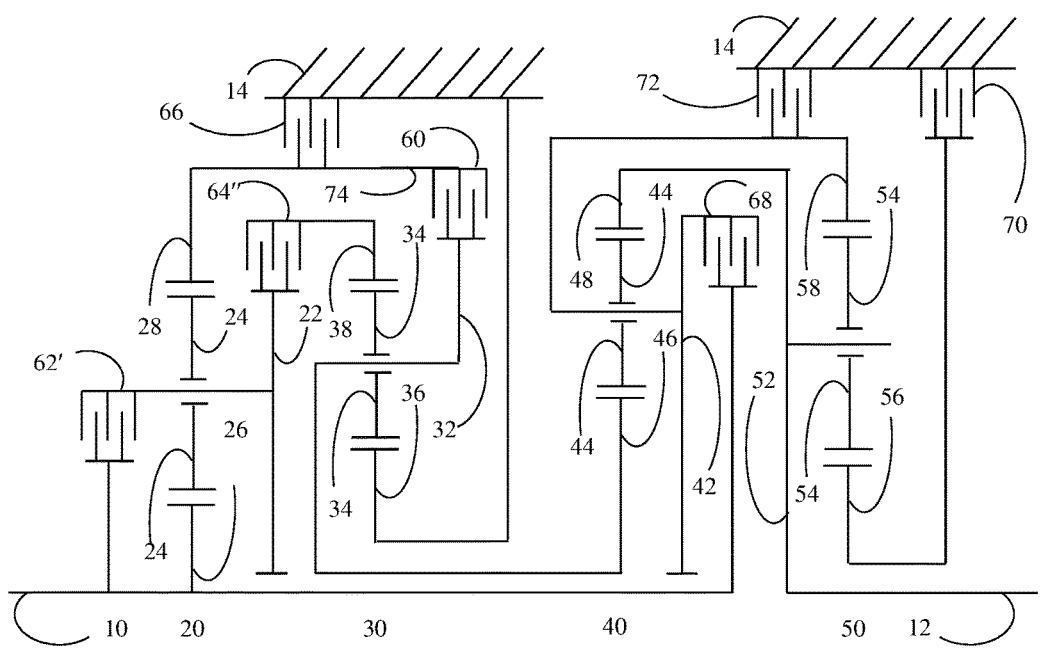
FIG. 3 is a schematic diagram of a third transmission gearing arrangement.

A third example transmission is illustrated in FIG. 3. This transmission utilizes four simple planetary gear sets with suggested tooth number ratios as shown in Table 1. Input shaft 10 is fixedly coupled to sun gear 26, sun gear 36 is fixedly held against rotation, ring gear 28 is fixedly coupled to intermediate shaft 74, carrier 32 is fixedly coupled to sun gear 46, carrier 42 is fixedly coupled to ring gear 58, and output shaft 12 is fixedly coupled to ring gear 48 and carrier 52. Intermediate shaft 74 is selectively coupled to carrier 32 by clutch 60 and selectively held against rotation by brake 66. Carrier 22 is selectively coupled to input shaft 10 by clutch 62', which has the effect of selectively indirectly coupling input shaft 10 to intermediate shaft 74. Carrier 22 is also selectively coupled to ring gear 38 by clutch 64". Carrier 42 and ring gear 58 are selectively held against rotation by brake 72 and selectively coupled to input shaft 10 by clutch 68. Sun gear 56 is selectively held against rotation by brake 70. The transmission of FIG. 3 is operated in the same fashion as the transmissions of FIGS. 1 and 2.

Figure 4:
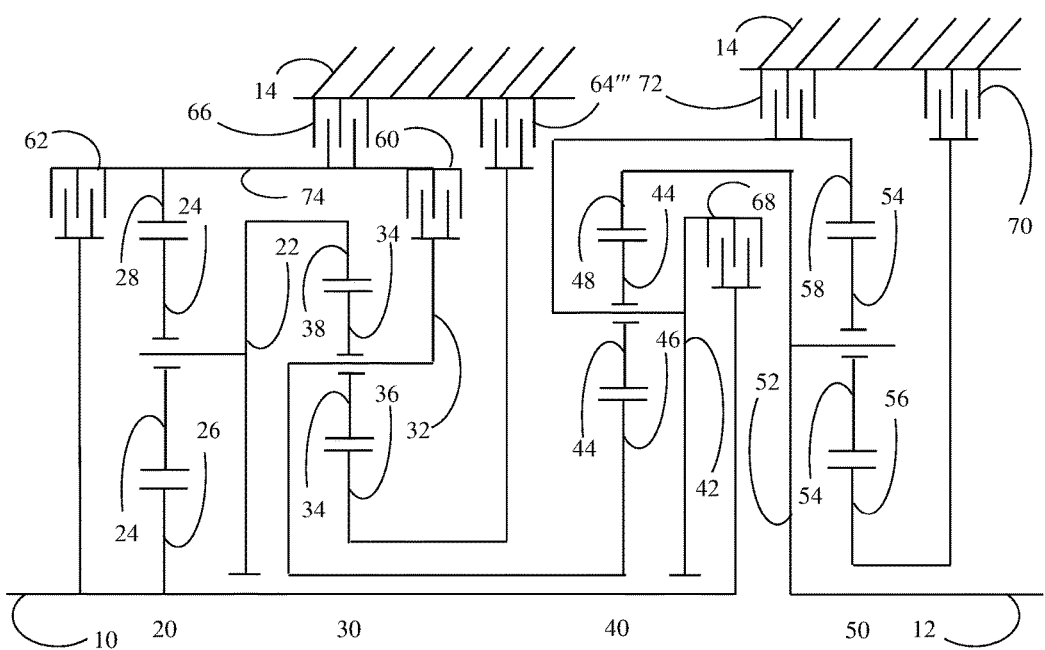
FIG. 4 is a schematic diagram of a fourth transmission gearing arrangement.

A fourth example transmission is illustrated in FIG. 4. This transmission utilizes four simple planetary gear sets with suggested tooth number ratios as shown in Table 1. Input shaft 10 is fixedly coupled to sun gear 26, ring gear 28 is fixedly coupled to intermediate shaft 74, carrier 22 is fixedly coupled to ring gear 38, carrier 32 is fixedly coupled to sun gear 46, carrier 42 is fixedly coupled to ring gear 58, and output shaft 12 is fixedly coupled to ring gear 48 and carrier 52. Intermediate shaft 74 is selectively coupled to carrier 32 by clutch 60, selectively coupled to input shaft 10 by clutch 62, and selectively held against rotation by brake 66. Sun gear 36 is selectively held against rotation by brake 64'''. Carrier 42 and ring gear 58 are selectively held against rotation by brake 72 and selectively coupled to input shaft 10 by clutch 68. Sun gear 56 is selectively held against rotation by brake 70. The transmission of FIG. 4 is operated in the same fashion as the transmissions of FIGS. 1-3.

Figure 5:
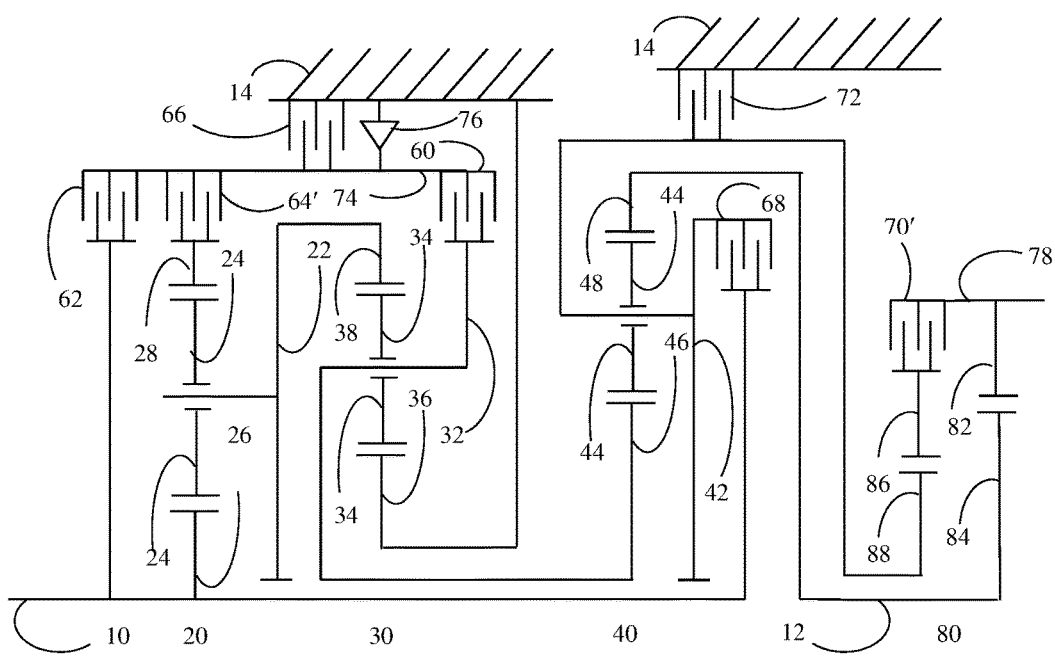
FIG. 5 is a schematic diagram of a fifth transmission gearing arrangement.

A fifth example transmission is illustrated in FIG. 5. This transmission utilizes three simple planetary gear sets 20, 30, and 40 with suggested tooth number ratios as indicated in Table 1. These simple planetary gear sets have a sun gear, a ring gear, and a carrier that rotate about a central axis. Additionally, axis transfer gears 84 and 88 are supported for rotation about this central axis. Gear 84 is radially larger than gear 88. Layshaft 78 is parallel to the central axis but offset from the central axis. Axis transfer gears 82 and 86 are supported for rotation about the axis of layshaft 78. Axis transfer gears 82 and 86 continuously mesh with axis transfer gears 84 and 88 respectively.

Input shaft 10 is fixedly coupled to sun gear 26, sun gear 36 is fixedly held against rotation, carrier 22 is fixedly coupled to ring gear 38, carrier 32 is fixedly coupled to sun gear 46, carrier 42 is fixedly coupled to axis transfer gear 88, axis transfer gear 82 is fixedly coupled to layshaft 78, and output shaft 12 is fixedly coupled to ring gear 48 and axis transfer gear 84. Intermediate shaft 74 is selectively coupled to carrier 32 by clutch 60, selectively coupled to input shaft 10 by clutch 62, selectively coupled to ring gear 28 by clutch 64', and selectively held against rotation by brake 66. Carrier 42 and axis transfer gear 88 are selectively held against rotation by brake 72 and selectively coupled to input shaft 10 by clutch 68. Axis transfer gear 86 is selectively coupled to layshaft 78 by clutch 70'. This arrangement may be suitable for front wheel drive transmissions in which an axis transfer from the engine axis to the differential axis is required.

Various combinations of gear sets, axis transfer gears, clutches, and brakes selectively impose particular speed relationships. The combination of axis transfer gears 82, 84, 86, and 88 and clutch 70' selectively imposes an overdrive relationship between output shaft 12 and carrier 42. In other words, whenever clutch 70' is engaged, carrier 42 is constrained to rotate faster than output shaft 12 and in the same direction. Alternatively, this speed relationship could be established if axis transfer gear 86 is fixedly coupled to layshaft 78 and one of gear 82, 84, or 88 is selectively coupled to the respective shaft. In some embodiments, axis transfer gears 82 and 84 may be utilized to transfer power from output shaft 12 to a differential located on a parallel axis. In these embodiments, gears 82 and 84 must be fixedly coupled to the respective shafts. The combination of gear set 40, axis transfer gears 82, 84, 86, and 88, clutches 68 and 70', and brake 72 selectively establish various speed relationships among carrier 32, input shaft 10, and output shaft 12. When brake 72 is engaged, output shaft 12 rotates in the opposite direction as carrier 32. When clutch 70' is engaged, output shaft 12 rotates in the same direction as carrier 32 but at a slower speed. When clutch 68 is engaged, a linear speed relationship is established among carrier 32, input shaft 10, and output shaft 12. The transmission of FIG. 5 is operated in the same fashion as the transmissions of FIGS. 1-4.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further embodiments of the invention that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. As such, embodiments described as less desirable than other embodiments or prior art implementations with respect to one or more characteristics are not outside the scope of the disclosure and can be desirable for particular applications.

What is claimed is:

1. A transmission comprising:
   a first gearset having a first sun, a first ring fixedly coupled to an output, and a first carrier selectively held against rotation by a first brake and selectively coupled to an input by a first clutch;
   a second gearset having a second sun selectively held against rotation by a second brake, a second ring fixedly coupled to the first carrier, and a second carrier fixedly coupled to the output; and
   a gearing arrangement configured to selectively establish a plurality of speed ratios between the first sun and the input, the plurality of speed ratios including zero, one, and three ratios between zero and one.

2. The transmission of claim 1 wherein the first brake is a latch.

3. The transmission of claim 1 wherein the gearing arrangement comprises:
   a transmission case;
   an intermediate shaft;
   a third gearset having a third sun coupled to the input, a third ring coupled to the intermediate shaft, and a third carrier;
   a fourth gearset having a fourth sun coupled to the transmission case, a fourth ring coupled to the third carrier, and a fourth carrier fixedly coupled to the first sun;
   a third brake selectively holding the intermediate shaft against rotation;
   a second clutch selectively coupling the first sun to the intermediate shaft; and
   a third clutch selectively coupling the input to the intermediate shaft.

4. The transmission of claim 3 wherein the third brake comprises:
   a friction brake; and
   a passive one way brake.

5. The transmission of claim 3 further comprising a fourth clutch, wherein:
   the third sun is selectively coupled to the input by the fourth clutch;
   the third ring is fixedly coupled to the intermediate shaft;
   the fourth sun is fixedly coupled to the transmission case; and
   the fourth ring is fixedly coupled to the third carrier.

6. The transmission of claim 3 further comprising a fourth clutch, wherein:
   the third sun is fixedly coupled to the input;
   the third ring is selectively coupled to the intermediate shaft by the fourth clutch;
   the fourth sun is fixedly coupled to the transmission case; and
   the fourth ring is fixedly coupled to the third carrier.

7. The transmission of claim 3 further comprising a fourth clutch, wherein:
   the third sun is fixedly coupled to the input;
   the third ring is fixedly coupled to the intermediate shaft;
   the fourth sun is fixedly coupled to the transmission case; and the fourth ring is selectively coupled to the third carrier by the fourth clutch.

8. The transmission of claim 3 further comprising a fourth clutch, wherein:
the third sun is fixedly coupled to the input;
the third ring is fixedly coupled to the intermediate shaft;
the fourth sun is selectively coupled to the transmission case by the fourth clutch; and
the fourth ring is fixedly coupled to the third carrier.

9. The transmission of claim 3 wherein the third clutch is configured to directly selectively couple the input to the intermediate shaft.

10. The transmission of claim 3 wherein the third clutch is configured to selectively directly couple the third carrier to one of the third sun and the third ring.

11. A transmission comprising:
first, second, and third shafts;
an input shaft;
a first gearing arrangement configured to fixedly constrain the second shaft to rotate faster than the first shaft and in a same direction;
a second gearing arrangement configured to selectively impose a linear speed relationship among the input shaft, the second shaft, and the third shaft;
a first brake configured to selectively hold the third shaft against rotation;
a first clutch configured to selectively couple the first shaft to the third shaft; and
a second clutch configured to selectively couple the input shaft to the third shaft.

12. The transmission of claim 11 wherein the first brake comprises:
a friction brake; and
a passive one way brake.

13. The transmission of claim 11 wherein the first gearing arrangement comprises:
a first simple planetary gear set having a first sun gear fixedly held against rotation, a first ring gear fixedly coupled to the second shaft, a first planet carrier fixedly coupled to the first shaft, and at least one planet gear supported for rotation on the first planet carrier and in continuous meshing engagement with the first sun gear and the first ring gear.

14. The transmission of claim 13 wherein the second gearing arrangement comprises:
a second simple planetary gear set having a second sun gear, a second ring gear fixedly coupled to the third shaft, a second planet carrier fixedly coupled to the second shaft, and at least one planet gear supported for rotation on the second planet carrier and in continuous meshing engagement with the second sun gear and the second ring gear; and
a third clutch configured to selectively couple the input shaft to the second sun gear.

15. The transmission of claim 13 wherein the second gearing arrangement comprises:
a second simple planetary gear set having a second sun gear fixedly coupled to the input shaft, a second ring gear, a second planet carrier fixedly coupled to the second shaft, and at least one planet gear supported for rotation on the second planet carrier and in continuous meshing engagement with the second sun gear and the second ring gear; and
a third clutch configured to selectively couple the third shaft to the second ring gear.

16. The transmission of claim 13 wherein the second gearing arrangement comprises:
a second simple planetary gear set having a second sun gear fixedly coupled to the input shaft, a second ring gear fixedly coupled to the third shaft, a second planet carrier, and at least one planet gear supported for rotation on the second planet carrier and in continuous meshing engagement with the second sun gear and the second ring gear; and
a third clutch configured to selectively couple the first ring gear to the second planet carrier.

17. The transmission of claim 11 further comprising:
an output shaft; and
a third gearing arrangement configured to i) selectively constrain the output shaft to rotate slower than the first shaft and in a same direction, ii) selectively constrain the output shaft to rotate slower than the first shaft and in an opposite direction, and iii) selectively impose a linear speed relationship among the first shaft, the input shaft, and the output shaft.

18. The transmission of claim 11 further comprising:
fourth and fifth shafts;
an output shaft;
a third gearing arrangement configured to fixedly impose a linear speed relationship among the first shaft, the fourth shaft, the output shaft, and the fifth shaft;
a second brake configured to selectively hold the fifth shaft against rotation;
a third brake configured to selectively hold the fourth shaft against rotation; and
a fourth clutch configured to selectively couple the fourth shaft to the input shaft.

19. The transmission of claim 18 wherein the third brake is a latch.

20. A transmission comprising:
first, second, third, fourth, and fifth shafts;
an input shaft;
an output shaft;
a first gearing arrangement configured to fixedly constrain the second shaft to rotate faster than the first shaft and in a same direction;
a second gearing arrangement configured to fixedly impose a linear speed relationship among the input shaft, the second shaft, and the third shaft;
a third gearing arrangement configured to
selectively constrain the output shaft to rotate slower than the first shaft and in the same direction,
selectively constrain the output shaft to rotate slower than the first shaft and in an opposite direction, and
selectively impose a linear speed relationship among the first shaft, the input shaft, and the output shaft; and
a plurality of shift elements configured to
selectively hold the third shaft against rotation,
selectively couple the first shaft to the third shaft,
selectively couple the input shaft to the third shaft, and
selectively couple the input shaft to the first shaft.

21. The transmission of claim 20 wherein the plurality of shift elements comprises:
a sixth shaft;
a third brake configured to selectively hold the sixth shaft against rotation;
a second clutch configured to selectively couple the sixth shaft to the input shaft;
a third clutch configured to selectively couple the sixth shaft to the third shaft; and
a fourth clutch configured to selectively couple the sixth shaft to the first shaft.

22. The transmission of claim 21 wherein the third brake comprises:
  a friction brake; and
  a passive one way brake.

* * * * *